US008724246B2

(12) United States Patent
Bui et al.

(10) Patent No.: US 8,724,246 B2
(45) Date of Patent: *May 13, 2014

(54) SYSTEM FOR FAST CENTER CALIBRATION OF A TAPE DRIVE FOR A FLANGELESS TAPE PATH (71) Applicant: International Business Machines Corporation, Armonk, NY (US)

(72) Inventors: Nhan X. Bui, Tucson, AZ (US); Reed A. Hancock, Tucson, AZ (US); Randy C. Inch, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/909,959

(22) Filed: Jun. 4, 2013

(65) Prior Publication Data

US 2013/0265671 A1 Oct. 10, 2013

Related U.S. Application Data (63) Continuation of application No. 13/152,238, filed on Jun. 2, 2011, now Pat. No. 8,526,134.

(51) Int. Cl.
*G11B 5/584* (2006.01)

(52) U.S. Cl.
USPC .......................................... 360/55; 360/77.12

(58) Field of Classification Search
None
See application file for complete search history.

(56) References Cited

U.S. PATENT DOCUMENTS

| 5,379,165 | A  | 1/1995  | Pahr            |
| 5,629,813 | A  | 5/1997  | Baca et al.     |
| 5,872,672 | A  | 2/1999  | Chliwnyj et al. |
| 6,108,159 | A  | 8/2000  | Nute et al.     |
| 6,185,063 | B1 | 2/2001  | Cameron         |
| 6,462,899 | B1 | 10/2002 | Chliwnyj et al. |
| 6,587,303 | B1 | 7/2003  | Bui et al.      |
| 6,674,603 | B2 | 1/2004  | Basham et al.   |

(Continued)

FOREIGN PATENT DOCUMENTS

| CN | 1329335 A | 1/2002  |
| CN | 1447965 A | 10/2003 |

(Continued)

OTHER PUBLICATIONS

Steele et al., "Multi-Tapped Magnetoresistive Heads for Magnetic Tape Tracking Servo", 1998 IEEE, IEEE Transactions On Magnetics, vol. 34, No. 4, Jul. 1998, pp. 1904-1906.

(Continued)

*Primary Examiner* — Wayne Young
*Assistant Examiner* — James L Habermehl
(74) *Attorney, Agent, or Firm* — Zilka-Kotab, PC (57) ABSTRACT A servo system according to one embodiment includes a servo control configured to: determine position error between a magnetic head and a desired position related to at least one defined servo track on a longitudinal tape based on at least one servo signal; calculate a first average position of the magnetic head while the longitudinal tape is moved in a first direction; calculate a first offset of the magnetic head while the longitudinal tape is moved in the first direction based on a target position and an assumption that the first average position of the magnetic head occurred when the tape was at a top-most position or a bottom-most position of a supply reel; and operate an actuator to position the actuator substantially at the target position using the first offset and the first average position.

18 Claims, 7 Drawing Sheets

(56) References Cited

U.S. PATENT DOCUMENTS

| | | |
|---|---|---|
| 6,768,604 B2 | 7/2004 | Anderson |
| 6,963,467 B2 | 11/2005 | Bui et al. |
| 7,436,621 B2 | 10/2008 | Goker et al. |
| 7,826,165 B2 | 11/2010 | Kawakami et al. |
| 7,957,088 B1 | 6/2011 | Bui et al. |
| 7,961,421 B1 | 6/2011 | Bui et al. |
| 8,027,121 B2 | 9/2011 | Argumedo et al. |
| 8,059,362 B2 | 11/2011 | Hancock et al. |
| 8,134,797 B2 | 3/2012 | Bui et al. |
| 8,526,134 B2 | 9/2013 | Bui et al. |
| 2003/0016467 A1 | 1/2003 | Bui et al. |
| 2004/0001276 A1 | 1/2004 | Chliwnyj et al. |
| 2007/0041121 A1 | 2/2007 | Neumann |
| 2007/0230033 A1 | 10/2007 | McAllister et al. |
| 2011/0102937 A1 | 5/2011 | Argumedo et al. |
| 2012/0307401 A1 | 12/2012 | Bui |
| 2012/0307402 A1 | 12/2012 | Bui |

FOREIGN PATENT DOCUMENTS

| | | |
|---|---|---|
| EP | 0420374 A2 | 4/1991 |
| EP | 0630001 A2 | 12/1994 |
| EP | 1 310 947 A2 | 5/2003 |
| JP | 2008/287836 A | 11/2008 |
| WO | 9305506 A1 | 3/1993 |
| WO | 9400839 A1 | 1/1994 |
| WO | 2011/054558 A1 | 5/2011 |

OTHER PUBLICATIONS

International Search Report from application No. PCT/CN2012/076099 dated Aug. 30, 2012.

SYSTEM FOR FAST CENTER CALIBRATION OF A TAPE DRIVE FOR A FLANGELESS TAPE PATH

RELATED APPLICATIONS

This application is a continuation of copending U.S. patent application Ser. No. 13/152,238, filed Jun. 2, 2011, which is incorporated herein by reference.

BACKGROUND

The present invention relates to servo systems for track-following longitudinal tape movement in a longitudinal direction, and more particularly, to fast center calibration of a tape drive that is used with a flangeless tape path.

The function of a servo system for longitudinal tape, such as magnetic tape, is to move a head laterally in respect to the longitudinal tape to accurately follow the lateral movement of the tape, for example, during read/write operations of the head. If done accurately, the data tracks are written and read in straight lines along the longitudinal tape as the tape is moved in the longitudinal direction. With respect to magnetic tape, the data comprises parallel stripes in the longitudinal direction of the magnetic tape. Servo tracks are prerecorded in the magnetic tape parallel to, and offset from, the expected data stripes. Typically, the lateral movement of the magnetic tape is constrained by flanges present on tape guides at either side of the head, such that the servo system causes the head to follow the data stripes in the presence of disturbances mainly created from limited lateral motion of the tape, called LTM (Lateral Tape Motion) or tape excursions.

Servo systems often employ compound actuators to move the head laterally both for track following, and to shift from one servo track (or set of servo tracks) to another and to follow a different set of data stripes. A compound actuator, which comprises a coarse actuator and a fine actuator mounted on the coarse actuator, provides both a large working dynamic range and high bandwidth. The high bandwidth fine actuator typically has a limited range of travel to attain the high bandwidth, and, in the typical track following arrangement, with the fine actuator as the master and the coarse actuator as a slave to the movement of the fine actuator, if the fine actuator drifts to one side as the tape moves laterally, the coarse actuator follows (at a slower rate) the centerline of the movement of the fine actuator. This action is discussed in more detail in U.S. Pat. No. 6,587,303, issued Jul. 1, 2003, which is herein incorporated by reference.

The flanges of the tape guides, such as rollers, limit the lateral motion of the tape, but may tend to flex the tape and to introduce debris accumulation of the flanges that impact the lifetime of the tape and in addition create undesirable dynamic effects.

Flangeless tape guides, such as those used by IBM® LTO Generation 5 tape drives, IBM® 3592E07 tape drives and later, among others, tend to solve the problems of the flanged tape guides, but, without being constrained, the longitudinal tape tends to rapidly shift from one side of the tape guides to the other, and to run at one side of the guides for only a short period. Thus, in an attempt to follow the tape from one side to the other, the coarse actuator, in following the centerline of the movement of the fine actuator, is required to move from side to side as the tape rapidly shifts. This motion tends to wear and shorten the life of the coarse actuator, and is a use of power by the coarse actuator In flangeless tape path designs, LTM or tape excursions may exceed a range of a fine actuator if the tape is not centered to the excursions as LTM occurs. This is because the fine actuator has a limited range of motion, and is designed such that it can scan the width of the tape. Therefore, if the head is positioned near a top or bottom of the longitudinal tape before fine actuation is performed, there is a chance that the fine actuator may not be able to drive the head to the other side of the longitudinal tape. In order to account for this deficiency, the drive must determine the midpoint of lateral tape excursions and place a coarse actuator system at this midpoint to allow the fine actuator to track-follow the longitudinal tape regardless of the excursions moving up or the excursions moving down. Finding the midpoint of the lateral tape excursion is not easy, as the midpoint of the lateral tape excursion is unique to each drive and the coarse and fine actuator systems have no absolute reference positions relative to the longitudinal tape path. Accordingly, the midpoint of the lateral tape excursion must be identified individually for each drive.

One method to find the midpoint of the lateral tape excursion when the tape moves between the top-most position and bottom-most position is fairly straight forward, and has been previously described in U.S. patent application Ser. No. 12/612,403, filed Nov. 4, 2009, which is herein incorporated by reference. However, some tapes behave in ways that make it difficult to find these extremes from which the midpoint of the lateral tape excursion may be calculated. Some tapes exhibit a behavior in which the tape is always or almost always in the top-most position in relation to the flangeless supply and take-up reels. Other tapes exhibit a behavior where the tape is always or almost always in the bottom-most position in relation to the flangeless supply and take-up reels. This makes calculating the midpoint of the lateral tape excursion for the tape drive impossible using existing methods, since LTM does not occur to an extent necessary to observe full lateral movement from which a midpoint may be calculated. Other tapes exhibit small excursions (also referred to as "runts") away from one extreme but do not move completely to the other extreme. This behavior also makes it difficult to determine a proper midpoint of the lateral tape excursion or even sense the tape excursions.

Using typical centering methods, the tape position is approximated or determined by integrating the current flowing to the fine actuator, referred to as an integrator value. Another problem in determining the midpoint of the lateral tape excursion is that the current contains fine actuator track-following current, and thus integrated track-following values, that are a function of the reel run-outs as well as tape motion, which may typically include excursions.

Current tape centering methods require that both the top- and bottom-most positions be determined before a midpoint of the lateral tape excursion can be calculated. In order to determine the top- and bottom-most positions, often it is necessary to move the tape from beginning of tape (BOT) to end of tape (EOT), and then back to BOT with the anticipation that sufficient tape excursions will occur in both directions to be able to calculate the midpoint of the lateral tape excursion. If the top- or bottom-most positions are not properly detected, an incorrect midpoint of the lateral tape excursion may be calculated and the drive will not behave properly and may even cause a condition where the drive will no longer function if an inaccurate midpoint is calculated.

BRIEF SUMMARY

A servo system according to one embodiment includes a servo control configured to: determine position error between a magnetic head and a desired position related to at least one defined servo track on a longitudinal tape based on at least one servo signal; calculate a first average position of the magnetic head while the longitudinal tape is moved in a first direction; calculate a first offset of the magnetic head while the longitudinal tape is moved in the first direction based on a target position and an assumption that the first average position of the magnetic head occurred when the tape was at a top-most position or a bottom-most position of a supply reel; and operate an actuator to position the actuator substantially at the target position using the first offset and the first average position A servo system according to another embodiment includes a servo control configured to: calculate a first average position of a magnetic head for at least one first run-out cycle while the longitudinal tape is moved in the first direction; calculate a second average position of the magnetic head for at least one second run-out cycle while the longitudinal tape is moved in the first direction; calculate a deviation between the first average position and the second average position, the deviation being related to a first actual lateral tape excursion of the at least one defined servo track while the longitudinal tape is moved in the first direction; and calculate a first offset of the magnetic head while the longitudinal tape is moved in the first direction based on the first actual lateral tape excursion, a target position, and whether the first average position of the magnetic head Other aspects and embodiments of the present invention will become apparent from the following detailed description, which, when taken in conjunction with the drawings, illustrates by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description describes methods and systems for estimating a midpoint of lateral tape excursion of a flangeless tape path for calibrating a tape drive.

In one general embodiment, a servo system includes a servo control configured to: determine position error between a magnetic head and a desired position related to at least one defined servo track on a longitudinal tape based on at least one servo signal; calculate a first average position of the magnetic head while the longitudinal tape is moved in a first direction; calculate a first offset of the magnetic head while the longitudinal tape is moved in the first direction based on a target position and an assumption that the first average position of the magnetic head occurred when the tape was at a top-most position or a bottom-most position of a supply reel; and operate an actuator to position the actuator substantially at the target position using the first offset and the first average position In another general embodiment, a servo system includes a servo control configured to: calculate a first average position of a magnetic head for at least one first run-out cycle while the longitudinal tape is moved in the first direction; calculate a second average position of the magnetic head for at least one second run-out cycle while the longitudinal tape is moved in the first direction; calculate a deviation between the first average position and the second average position, the deviation being related to a first actual lateral tape excursion of the at least one defined servo track while the longitudinal tape is moved in the first direction; and calculate a first offset of the magnetic head while the longitudinal tape is moved in the first direction based on the first actual lateral tape excursion, a target position, and whether the first average position of the magnetic head occurred when the tape was at a top-most position or a bottom-most position of a supply reel.

In use, a tape following a flangeless tape path will typically either position itself in a top-most or a bottom-most position during tape motion. The tape is seldom positioned in a center position during tape motion. This observation may be used to develop methods for determining a midpoint of the lateral tape excursion according to some approaches.

Figure 1:
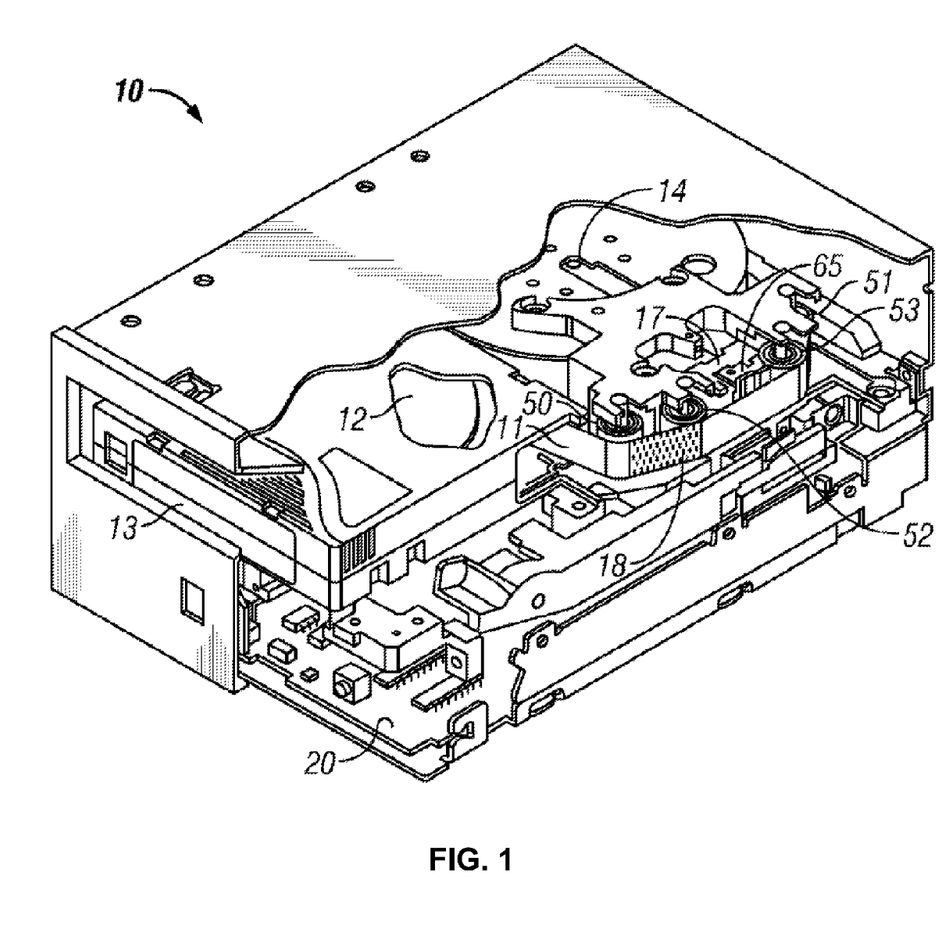
FIG. 1 is a partially cut away view of an exemplary magnetic tape data storage drive which may implement embodiments of the present invention.
Figure 2:
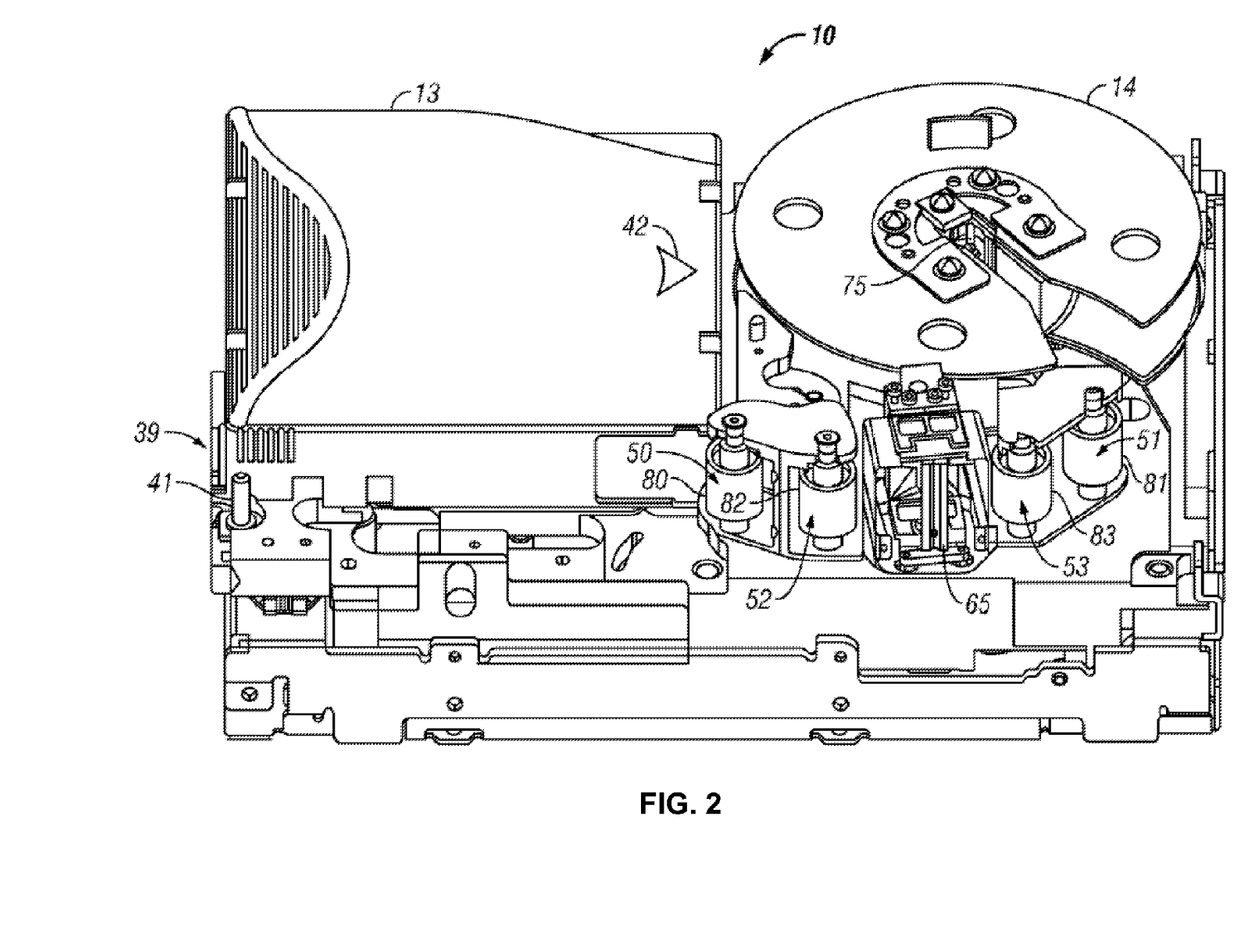
FIG. 2 is a view of the data storage drive of FIG. 1 with the cover removed, according to one embodiment.

FIGS. 1 and 2 illustrate a magnetic tape data storage drive 10 which writes data 18 to and reads data from longitudinal tape comprising magnetic tape data storage media 11, according to one embodiment.

As is understood by those of skill in the art, magnetic tape data storage drives, also called magnetic tape drives or tape drives, may take any of various forms. The illustrated magnetic tape drive 10 moves the magnetic tape 11 along a tape path in the longitudinal direction of the tape from a supply reel 12 in a magnetic tape data storage cartridge 13 to a take-up reel 14. An example of a magnetic tape drive is the IBM® LTO (Linear Tape Open) magnetic tape drive. Another example of a magnetic tape drive is the IBM® TotalStorage Enterprise magnetic tape drive. Both the above examples of magnetic tape drives employ single reel tape cartridges 13. An alternative magnetic tape drive and magnetic tape cartridge is a dual reel cartridge and drive in which both reels 12 and 14 are contained in the cartridge.

The magnetic tape media 11 is moved in the longitudinal direction across a tape head 65. The tape head may be supported and laterally moved by a compound actuator 17 of a track following servo system. The magnetic tape media is supported by roller tape guides 50, 51, 52, 53, which are flangeless, while the magnetic tape media is moved longitudinally.

A typical magnetic tape data storage drive operates in both forward and reverse directions to read and write data. Thus, the magnetic tape head 65 may comprise one set of read and write elements for operating in the forward direction and another set for operating in the reverse direction, or alternatively, may have two sets of the read elements on either side of the write elements to allow the same write elements to write in both directions while the two sets of read elements allow a read-after-write in both directions.

The magnetic tape data storage drive 10 comprises one or more controls 20 for operating the magnetic tape data storage drive in accordance with commands received from an external system. The external system may comprise a network, a host system, a data storage library or automation system, a data storage subsystem, etc., as would be apparent to one of skill in the art upon reading the present descriptions. A control 20 typically comprises logic and/or one or more microprocessors with a memory 19 for storing information and program information for operating the microprocessor(s) and drive. The program information may be supplied to the memory via the interface 21, by an input to the control 20 such as a floppy disk, optical disk, Flash memory, CD-ROM, etc., or by reading from a magnetic tape cartridge, or by any other suitable device or methodology. The magnetic tape data storage drive 10 may comprise a standalone unit or comprise a part of a tape library or other subsystem, which may comprise the external system. The control 20 also provides the data flow and formatter for data to be read from and written to the magnetic tape media, as is known to those of skill in the art.

A cartridge receiver 39 is configured to receive a magnetic tape cartridge 13 oriented in a single direction, and to align the magnetic tape cartridge, for example, with guide pin 41, with respect to the cartridge receiver. The proper orientation may be illustrated on the cartridge itself, for example, by arrow 42 on the cartridge. The proper orientation may be enforced by the specific shape of the cartridge or by using various notches that interact with the receiver, as is known to those of skill in the art. The orientation of the magnetic tape cartridge is such that the magnetic tape 11 exits the cartridge at a specified point of the cartridge receiver. A tape threading mechanism may move the free end of the magnetic tape 11 from the magnetic tape cartridge 13 to a take up reel 14, for example, positioning the free end leader block at the central axis 75 of the take up reel. The magnetic tape is thus positioned along the tape path.

In the illustrated embodiment, flangeless tape guide rollers 50, 51, 52 and 53 each has a cylindrical surface 80, 81, 82, 83 oriented to provide a tape path for the magnetic tape 11 across the magnetic tape head 65.

The tape path comprises at least one flangeless tape guide roller 50 positioned between the magnetic tape cartridge 13 and magnetic tape head 65, and may comprise at least one flangeless tape guide roller 50, 51 at either side of the magnetic tape head 65. Additional tape guide rollers or other types of guides may be provided depending on the length and/or complexity of the tape path, and preferably comprise flangeless tape guide rollers, such as tape guide rollers 52 and 53.

Figure 3:
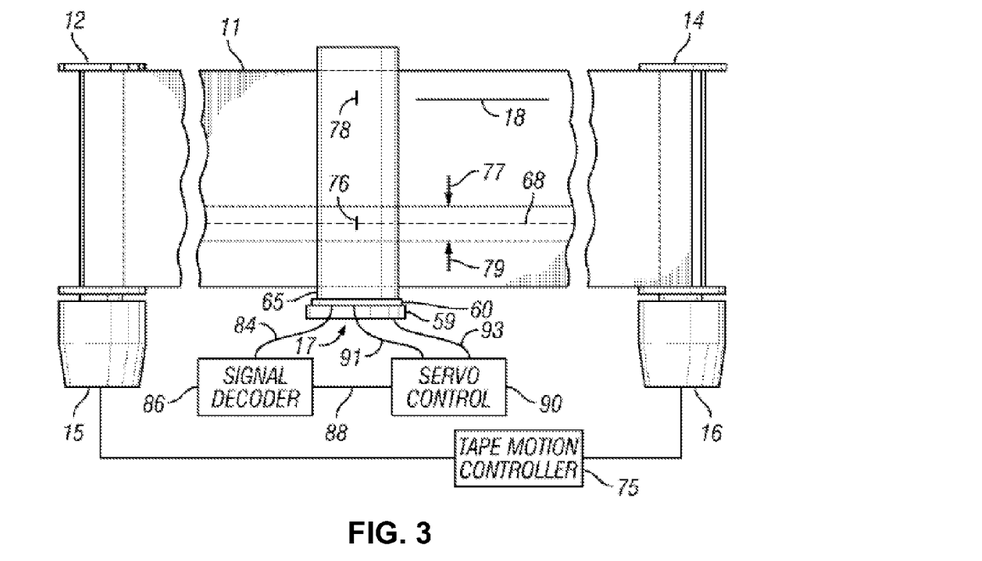
FIG. 3 is a schematic view of the longitudinal tape, tape head and servo system of FIG. 1, according to one embodiment.

Referring to FIG. 3, as would be apparent to one of skill in the art upon reading the present descriptions, flangeless tape guides, such as rollers 50, 51, 52 and 53 of FIG. 2, tend to solve the problems of flanged tape guides, but, as shown in FIG. 3, as the longitudinal tape 11 is moved longitudinally across the magnetic tape head 65, without being constrained, the tape tends to rapidly shift from one side of the tape head to the other, and to run at one side of the tape head for only a short period. However, in some systems, the tape may tend to run at one side of the tape head for extended periods of time, sometimes not shifting to the other side at all.

Still referring to FIG. 3, the longitudinal tape 11 is moved across the tape head 65 between reels 12 and 14 (the tape guide rollers are not shown) by reel motors 15 and 16 under the control of a tape motion controller 75 of control 20 of FIG. 1. The reel motors are operated at various speeds as controlled by the tape motion controller to insure that the magnetic tape media leaves one reel at the same speed that it is wound onto the other reel. Referring again to FIG. 3, the tape motion controller also controls the torque applied to each drive motor 15 and 16 to control the tension applied to the magnetic tape media at the tape head 65.

The magnetic tape head 65 comprises a servo read head, reader, or sensor 76 that senses a servo pattern recorded in a servo track 68 of the tape 11. The servo read head may comprise a plurality of servo read sensors at various positions of the magnetic head 65, and the servo track 68 may comprise a number of parallel servo tracks at various positions across the tape 11. As is understood by those of skill in the art, the servo tracks typically extend in the longitudinal direction the full length of the tape, and are prerecorded and defined as a part of the manufacturing process of the tape cartridge 13. A data head 78, which may comprise several data read/write transducers, is shown positioned over a data track region 18 of the tape, for example, containing a plurality of parallel data tracks. As is understood by those of skill in the art, typically, the defined servo tracks of magnetic tape systems are parallel to and offset from the data tracks. The servo track 68 is illustrated as a single line, for example a centerline of a servo track that is wide enough to allow a single servo track or set of tracks to allow servoing of various sets of data tracks by offsetting the servo head from the centerline.

As the tape 11 is moved longitudinally along the tape path, the servo read head 76 reads the servo signals which are provided on a servo signal line 84 to a servo decoder 86. The servo decoder processes the received servo signals and generates a position signal that is provided on a position signal line 88 to a servo control 90. The servo control 90 responds to seek signals to cause the compound actuator 17 to move between servo tracks, and responds to the position signals to cause the actuator 17 to follow the desired servo track.

As discussed above, as the longitudinal tape 11 is moved longitudinally across the magnetic tape head 65, the tape tends to either stay on one side of the tape head or to shift from one side of the tape head to the other. If the tape shifts, the shifting of the tape 11 results in shifting the servo track 68 in the lateral direction, illustrated in FIG. 3 as shifting between lateral shift extreme 77 and lateral shift extreme 79, comprising lateral shift excursions between the extremes.

Figure 4:
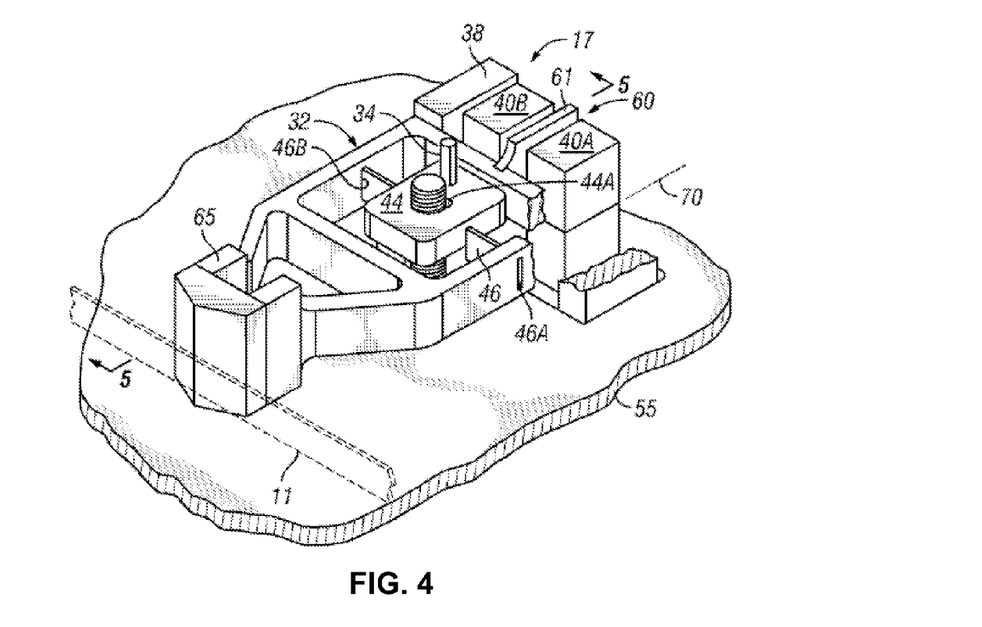
FIG. 4 is a view of a magnetic tape head and compound actuator of the data storage drive of FIG. 1, according to one embodiment.
Figure 5:
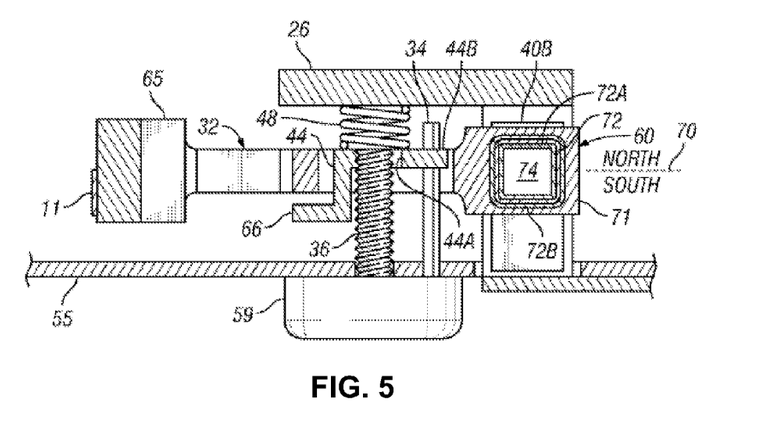
FIG. 5 is a partially cutaway side view of the magnetic tape head and compound actuator of FIG. 4, according to one embodiment.

Referring now to FIGS. 3, 4, and 5, the compound actuator 17 is illustrated according to one embodiment. The actuator 17 comprises an actuator arm 32 mounting the magnetic tape head 65. A coarse actuator motor 59 drives a lead screw 36 to move fine actuator stage 44 at an aperture 44A in a vertical direction perpendicular to a base 55. An aperture 44B is provided to receive an anti-rotation pin 34, and a load spring 48 is provided between a housing 26 and the stage 44. A torsion spring 46 is fixed to the stage 44 and is coupled at its ends 46A and 46B to the actuator arm 32 so that the stage 44 moves the head 65 mounted on the actuator arm 32 in a vertical direction across the tape.

A fine actuator coil assembly 60 is attached to an end of the actuator arm 32. The coil assembly 60 comprises a coil frame 71, a coil 72, and a mandrel 74, in one embodiment. The coil 62 has an upper portion 72A and a lower portion 72B, and is disposed between magnets 40A and 40B held in a magnet housing 38 which are arranged to split the north and south poles at approximately the line 70. The coil moves vertically upon application of a current at the coil 72 and causes the actuator arm 32 to pivot about torsion spring 46 and move the tape head 65 transversely of the tape 11 to make small adjustments such as in track following mode.

The servo control 90 responds to the position signals to generate servo control signals on line 91 to operate the fine actuator 60 to follow the desired servo track, and when the fine actuator movement is insufficient to accommodate the full move, or a large move is required for other purposes, the servo control 90 generates servo control signals on line 93 to cause the coarse actuator 59 to move the fine actuator is the desired direction.

Alternative compound actuators may be used as would be apparent to one of skill in the art upon reading the present descriptions. Each compound actuator has both a fine actuator providing high bandwidth, but with a limited range of travel, and a coarse actuator providing a large working dynamic range.

Figure 6:
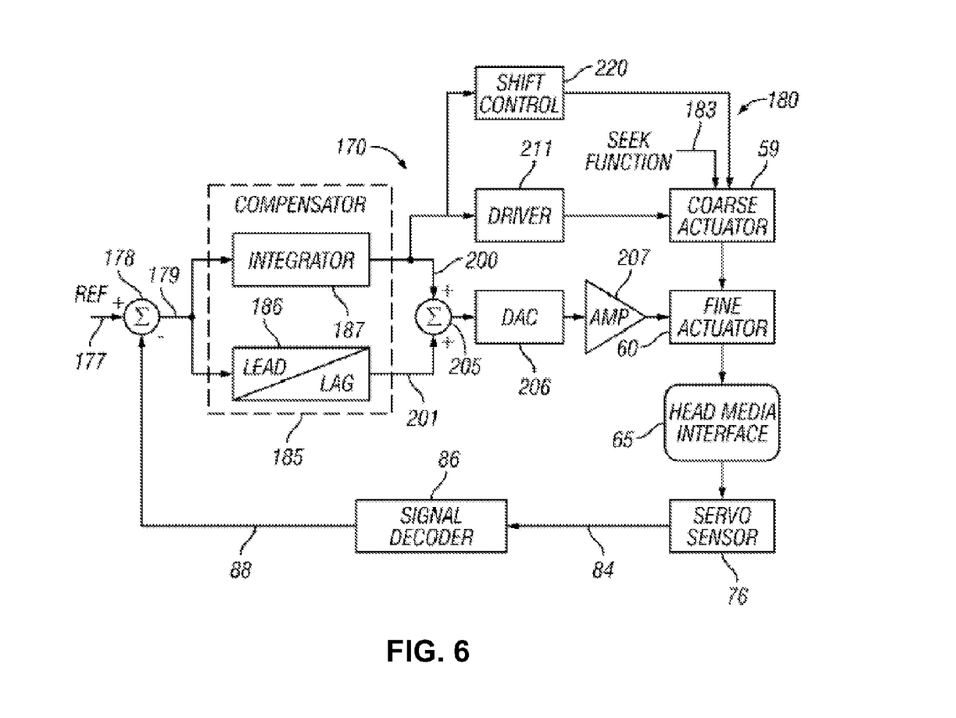
FIG. 6 is a block diagram of an embodiment of the servo system of FIG. 3.

A servo control 90 is illustrated in FIG. 6 as part of a position error signal loop 170 of a servo system 180, according to one embodiment. The operation of the servo system is discussed in detail in U.S. Pat. No. 6,587,303, referenced previously. Briefly, the servo signals are sensed by servo sensor 76 of head 65, and the position of the servo sensor relative to a servo track is detected from the servo signals by the signal decoder 86. The detected position signals are provided on line 88 and preferably comprise digital signals. The position signals are then compared to a reference signal 177 by a comparator 178 to determine position error between the read and a desired position related to the defined servo tracks, called the position error signal (PES) on line 179.

The fine actuator servo typically has a compensator function 185 in the position error signal loop, which is designed to enable maximum bandwidth with adequate stability margins. The compensator function 185 modifies the PES by applying a variable gain to the PES, which gain is based upon the frequency of the input PES 179, or, from another viewpoint, upon the rates of change of the input PES.

The compensator function 185 includes an integrator 187 and other transfer function elements, such as a lead/lag functional element 186, to achieve the desired static and dynamic system performance and overall stability. Each element may be implemented as a filter, either an analog filter employing discrete components, or a digital filter, such as an IIR (infinite impulse response) or as a FIR (finite impulse response), or as microcode causing a microprocessor to perform the function.

The integrator 187 provides a response 200 that generally reduces the gain as the frequency increases. The lead/lag element 186 provides a response 201 which is enhanced at high frequencies and reduced at low frequencies. The combined response 205 provides a servo signal to the fine actuator 60 that has both high bandwidth and stability, as is understood by those of skill in the art. A digital to analog converter 206 and power amplifier 207 apply the signal to the fine actuator 60.

The integrator 187 integrates the present signal, approximating the current and therefore the force applied to the fine actuator, with prior signals to determine the DC component of the fine actuator PES. An alternative integration function comprises determining the DC component of the drive current for the fine actuator. The integration function output signal on connection 200 provides an integration control signal to a driver 211, which drives the coarse actuator 59, operating the coarse actuator to translate the fine actuator. If the coarse actuator is a stepper motor, the driver 211 is preferably digital up-down logic and a stepper driver. Thus, if the absolute maximum value of the integration function output signal is larger than the absolute minimum value, the driver 211 operates the stepper motor to step in a direction to center the maximum and minimum values of the integration output signal. A step of the stepper motor may result in a linear translation of the fine actuator, for example, of about 12 microns. Alternatively, in one approach, if the coarse actuator is analog, the driver 211 may convert the digital signal to analog and employ a power amplifier to operate the coarse actuator 59.

The coarse actuator may also be operated by a seek function 183 which moves the fine actuator from one servo track to another.

The output 200 of the integrator is also supplied to a shift control 220 in accordance with one embodiment which moves the coarse actuator to a specific location and maintains it at that location.

As discussed above, flangeless tape guides 50, 51, 52 and 53 of FIG. 2 tend to solve the problems of the flanged tape guides, but, without being constrained, the longitudinal tape 11 tends to either stay at one side of the tape guide or the other, or shift from one side of the tape guides to the other, over short runs of tape. The motion may exceed the range in one direction of the fine actuator 60 and exceed one or the other of the coarse actuator thresholds. Thus, in an attempt to follow the tape from one side to the other during a tape shift, the coarse actuator 59, in following the centerline of the movement of the fine actuator 60, is required to move from side to side as the tape rapidly shifts. This motion tends to wear and shorten the life of the coarse actuator, and drains power unnecessarily.

According to one embodiment, a methodology for determining an offset for positioning of a coarse actuator in a flangeless tape path is very fast, more accurate than current methods, and less prone to problems and limitations of current methods. It can determine the offset without requiring both a top- and bottom-most lateral tape excursion. According to various embodiments, either sensing one extreme excursion and assuming an excursion up or down position allows this method to determine the offset, which in turn provides a target position for the coarse actuator away from an observed average head position. The methodology may also take advantage of the reel run-out component of the integrated current. This methodology reduces or eliminates the problem of a drive becoming inoperable if the wrong center value is determined/selected.

The method may be performed during Cartridge Initiation and does not require any extra time or operation to obtain an accurate offset, target position, or lateral tape excursion midpoint. It may be performed during the build of new drives without the use of special cartridges that contain excursions to top- and bottom-most positions. Since the midpoint of lateral tape excursions tends to be a function of the drive tape path geometry and does not depend on nor is a function of the tape cartridge itself, this method may be performed once and the offset from the average head position may be saved to the tape drive (along with any other values, such as midpoint, average head position, etc.). Therefore, the method, according to preferred embodiments, is not performed for each cartridge load.

In one embodiment, the method relies on the tape running at a fixed, known velocity during at least one run-out cycle. The fixed velocity may be in a range from about 3 msec to about 5 msec, such as about 4 msec, according to some embodiments. In another embodiment, the method may be performed at known reel radii near beginning of tape (BOT), and may be performed during Cartridge Initiation, in some approaches.

Using this knowledge, the integrated fine actuator current may be averaged over one run-out cycle (one motor revolution) to determine an average integrator value. The integrator value is related to an amount of current which is being supplied to the fine actuator in order to position the magnetic head in a position relative to the tape path. The next cycles may also be examined to see if there is a significant change or step in the average integrator value, in one approach. If there is no significant variation, then a running average of a few cycles is determined. If there is a significant step or change in the one cycle average over the running average of a few cycles, then it may be determined that a "runt" or a full lateral tape motion excursion has occurred and the direction of the runt or full lateral tape excursion may be determined. All of this may be determined in just a few reel run-out cycles occurring is less than one second of time.

Once a running average has been determined, an assumption is made as to which position this represents, e.g., either the top-most or bottom-most position. Since in most cartridges the tape prefers the top-most position, this is first assumed as the position determined from the running average calculations. If a runt or full excursion has occurred during the run-out cycles, then this can be used to identify which position the tape is in when the averaging occurred. If there has not been a runt or an excursion, then it is not known if the averaged integrator value is for an up-most or down-most tape excursion position. But the drive proceeds with the assumption that it is the up-most. Then, if during track following an error occurs, such as the integrator reaching its maximum range, which is easily detected, then it may be determined that the up-most assumption is not correct and the sign of the value is reversed so that it becomes the bottom-most position, and then tape reading may proceed. Once the original assumption has been verified to be in error and corrected, the drive saves a verified bit that indicates that the correct value for stepper offset has been determined and there is no more need to change the sign of the averaged integrator value for future tape motion on all cartridges used in the tape drive.

Next, the midpoint of the lateral tape excursion may be determined from the determined range experienced and/or estimated for tape cartridges (the difference between the top-most and bottom-most positions) which have a relatively narrow distribution. By knowing one of the edge conditions, e.g., top-most or bottom-most positions, the midpoint of the lateral tape excursion may be determined by adding (or subtracting) half of the known range to that edge value. This value may then be used throughout the use of this cartridge and is also saved to nonvolatile memory, such as vital product data (VPD) storage for possible future use.

According to an additional embodiment, as an enhancement, if a full excursion occurs in both tape directions while monitoring the integrator, the exact target position may be determined by simply finding the difference and dividing by two.

Figure 7:
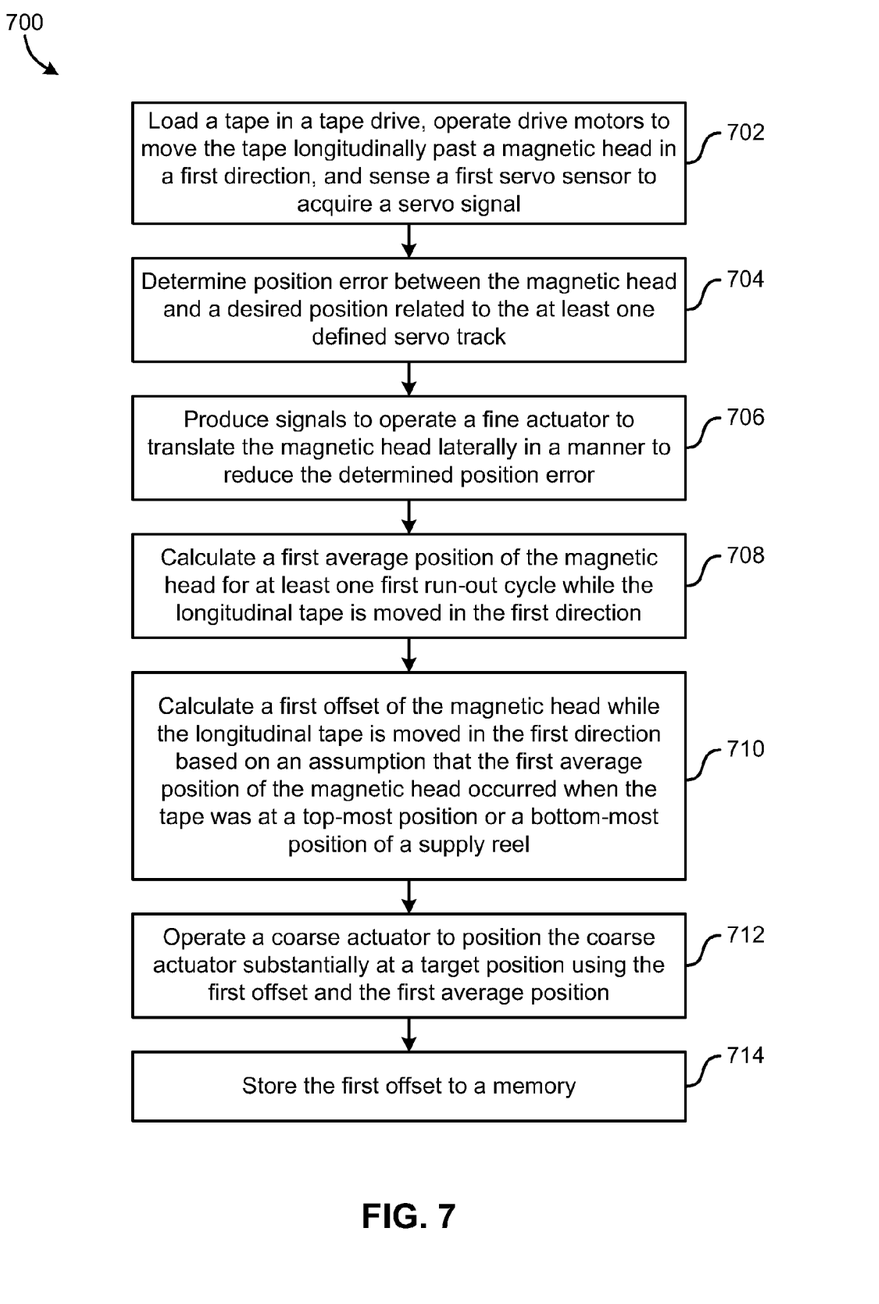
FIG. 7 is a flow diagram of a method, according to one embodiment.

Now referring to FIG. 7, a method 700 is shown according to one embodiment. The method 700 may be carried out in any desired environment, including those shown in FIGS. 1-6, according to various embodiments. Of course, more or less operations than those specifically described below may be included and/or excluded from method 700, according to various embodiments, as would be apparent to one of skill in the art upon reading the present descriptions.

In some embodiments, the method 700 may be performed during cartridge initiation.

In operation 702, a tape is loaded in a tape drive and a tape motion controller operates drive motors to move the tape longitudinally past a magnetic head in a first direction, a first servo sensor is sensed while the longitudinal tape is moved in the first direction, and the servo signal is acquired from the first servo sensor, such as by a signal decoder, in some approaches.

The first servo sensor is configured for sensing a lateral position of a magnetic head with respect to at least one defined servo track of the longitudinal tape. The first direction may, in one embodiment, move the tape from a tape supply reel or cartridge to a take-up reel, e.g., a forward direction. In an alternative embodiment, the first direction may move the tape from the take-up reel to the tape supply reel, e.g., a backward direction.

In operation 704, position error is determined between the magnetic head and a desired position related to the at least one defined servo track. This position error may be related to a fine actuator PES, in some embodiments.

In operation 706, signals are produced to operate a fine actuator to translate the magnetic head laterally in a manner to reduce the determined position error. The fine actuator is configured to translate the magnetic head laterally with respect to the longitudinal tape, as previously described.

For example, the servo signal is track-followed, and in one approach, an integrator may effectively integrate signals representing the force applied to the fine actuator and indicate the present position of the servo track with respect to the coarse actuator. Shift control may determine, from the integrator, the position component of the fine actuator relative to the coarse actuator. This position is one extreme of the lateral shift of the longitudinal tape.

In operation 708, a first average position of the magnetic head is calculated for at least one first run-out cycle while the longitudinal tape is moved in the first direction. A run-out cycle is equal to one motor revolution, and the first average position may be calculated based on an average integrator value for the fine actuator current, as previously described. The first average position is determined while the servo signal is track-followed.

In operation 710, a first offset of the magnetic head is calculated while the longitudinal tape is moved in the first direction based on an assumption that the first average position of the magnetic head occurred when the tape was at a top-most position or a bottom-most position of a supply reel. In preferred embodiments, the assumption is that the tape was at the top-most position of the supply reel while the magnetic head was at the calculated first average position. This assumption is possible because more times than not, the tape is positioned at the top-most position of the supply reel, and the averaging takes into account small fluctuations away from the top-most position. Of course, in some embodiments, the assumption may be that the tape is positioned at the bottom-most position of the tape supply reel. In either case, the assumption may take into account other factors, such as direction of runts or lateral tape movement that is experienced during the averaging of the first average position of the magnetic head. The situations where the tape is actually being fed from the bottom-most position but the assumption is made that the tape is being fed from the top-most position are described in detail later. The first offset may be determined as a difference between the first average position and a target position, in one approach. The target position is based on excursion characteristics of specific tape types, which may be identified from experience or through use of the tape type. In one approach, the target position may be a midpoint between a maximum lateral tape excursion and a minimum lateral tape excursion. Of course, other ways of describing a preferred coarse actuator position in relation to other values are possible, and this embodiment is not meant to limit other ways of determining a position of the coarse actuator which allows the fine actuator to translate the head to each maximum excursion of the tape.

In operation 712, a coarse actuator is operated to position the coarse actuator substantially at the target position using the first offset and the first average position. The coarse actuator is configured to translate the fine actuator laterally with respect to the longitudinal tape, as previously described. The target position may be related to a target integrator value, which is obtained by applying the calculated offset to a nominal stepper value. This operation positions the coarse and fine actuators such that the operating integrator value matches the target value, which relates to the target position.

In operation 714, the first offset is stored to a memory, preferably to a memory of the tape drive in which the longitudinal tape was loaded.

If in operation a drive error occurs such that a maximum integrator value is reached, then it is known that the assumption that the first average offset position of the magnetic head was in the top- or bottom-most position was in error. When this occurs, the sign of the first offset value is switched (e.g., "−" becomes "+," or vice versa). At this point, the position of the tape at either the top- or bottom-most position of the supply reel is known, not assumed, during the first track-following operation. According to one further embodiment, verification information may be stored in the memory indicating that the position of the tape during the first run-out is known, instead of just assumed.

In more embodiments, the method 700 may be performed only once for a tape drive, possibly during cartridge initiation, and the first offset may be used for reading each tape cartridge subsequently loaded into the tape drive.

Referring to FIG. 6, the first offset may be stored by the servo control 90, the control 20, in a cartridge memory of the cartridge, at a host system, etc., to be used for future mounts of this or any other tape, according to one embodiment. The process may also update the stored first offset each time the tape is loaded to insure that any changes are tracked, in another embodiment.

In one embodiment, a second average position of the magnetic head may be calculated for at least one second run-out cycle while the longitudinal tape is moved in the first direction, a deviation between the first average position and the second average position may be calculated, the deviation being related to a first actual lateral tape excursion of the at least one defined servo track while the longitudinal tape is moved in the first direction, it is determined that the deviation is in an anticipated direction or an unanticipated direction based on the assumption that the first average position of the magnetic head occurred when the tape was at the top-most position or the bottom-most position of the supply reel, the first offset is updated to account for the deviation being in the unanticipated direction (if it is in fact in the unanticipated direction, otherwise the first offset is not updated), the first offset is marked as verified, and the coarse actuator is operated to position the coarse actuator substantially at the target position based on the verified first offset and the first average position.

In more approaches, the first offset of the magnetic head may be marked as verified, such as by flipping a verified bit associated with the stored first offset, and the verified first offset may be stored to the memory. Then, the coarse actuator may be operated to position the coarse actuator substantially at the target position based on the first offset and the first average position of the magnetic head.

In some embodiments, as previously alluded to, it may be verified that the assumption is correct that the first average position of the magnetic head occurred when the tape was at the top-most position or the bottom-most position of the supply reel by using the first actual lateral tape excursion. For example, if the first actual lateral tape excursion is in a direction that is anticipated (e.g., down) based on the assumed reel position of the tape (e.g., that the tape was at the top-most position on the supply reel), then the assumption is verified. Otherwise, if the actual lateral tape excursion is in a direction that is unanticipated (e.g., up instead of down) based on the assumed reel position of the tape (e.g., that the tape was at the top-most position on the supply reel), then the assumption was incorrect since the first average position of the magnetic head occurred when the tape was at the bottom-most position of the supply reel. In this case, the first offset while the longitudinal tape is moved in the first direction is re-calculated based on the first actual lateral tape excursion, the first average position of the magnetic head having occurred when the tape was at the opposite position of the supply reel (e.g., bottom-most position instead or top-most position, or top-most position instead of bottom-most position), and the target position (e.g., at a midpoint between lateral tape excursion extremes).

For example, during the at least one second run-out cycle in the first direction, if the tape shifts the servo track from one lateral shift extreme to the opposite lateral shift extreme, the PES dramatically changes and the fine actuator is operated by the servo system to follow the change in PES, possibly exceeding a coarse actuator threshold.

Referring to FIG. 6, in one embodiment, the integrator 187 may indicate a first position of the servo track with respect to the coarse actuator 59 during the at least one first run-out cycle, and may determine the DC component of the PES for this period. Then, the integrator 187 may indicate the present position of the servo track with respect to the coarse actuator 59 during the at least one second run-out cycle, and may determine the DC component of the PES for this period. From the difference between the previously determined DC component and the present DC component, the shift control 220 may determine the lateral shift excursion of the servo track from one extreme position to the other extreme position as the result of the lateral shift excursion of the tape (lateral tape excursion).

Then, the shift control 220 may determine the midpoint of the lateral tape excursion of the defined servo track, and the coarse actuator 59 may be operated to shift the coarse actuator and position the coarse actuator 59 substantially at the determined midpoint of the lateral tape excursion of the defined servo track.

The shift control 220, in one embodiment, may maintain the coarse actuator 59 at substantially the midpoint location, and operate the position error signal loop and fine actuator 60 to reduce the determined position error. In one example, the shift control 220 maintains the coarse actuator 59 at the midpoint location by altering the positive and negative thresholds of the updown logic of driver 211 so that the coarse actuator 59 is not activated under normal tracking of the servo track. Thus, only the fine actuator 60 follows the lateral shift excursions, while the coarse actuator 59 remains at the midpoint.

In another embodiment, a second servo sensor may be sensed while the longitudinal tape is moved in a second direction. The second servo sensor is configured for sensing a lateral position of the magnetic head with respect to the at least one defined servo track of the longitudinal tape, the second servo sensor is positioned parallel to the first servo sensor in a direction of tape movement, and the second direction is opposite the first direction. In some approaches, the second direction moves the tape from a take-up reel to a tape supply reel, e.g., a backward direction.

In addition, position error between the magnetic head and a desired position related to the at least one defined servo track may be determined, signals to operate the fine actuator may be provided to translate the magnetic head laterally in a manner to reduce the determined position error, a third average position of the magnetic head may be calculated for at least one first run-out cycle while the longitudinal tape is moved in the second direction, a second offset of the magnetic head while the longitudinal tape is moved in the second direction may be calculated based on an assumption that the third average position of the magnetic head occurred when the tape was at the top-most position of the supply reel, the coarse actuator may be operated to position the coarse actuator substantially at the target position using the second offset and the third average position of the magnetic head, and the second offset may be stored to the memory.

In more embodiments, a fourth average position of the magnetic head may be calculated for at least one second run-out cycle while the longitudinal tape is moved in the second direction, a deviation between the third average position and the fourth average position may be calculated, the deviation being related to a second actual lateral tape excursion of the at least one defined servo track while the longitudinal tape is moved in the second direction, it may be determined that the deviation is in an anticipated direction or an unanticipated direction based on the assumption that the first average position of the magnetic head occurred when the tape was at the top-most position or the bottom-most position of the supply reel, the second offset may be updated to account for an unanticipated direction, the second offset may be marked as verified, and the coarse actuator may be operated to position the coarse actuator substantially at the target position based on the verified second offset and the third average position.

For example, for an assumption that the tape was at a top-most position of the supply reel when the third average position was determined, then when the deviation is in the unanticipated direction (e.g., up instead of down), the assumption is incorrect and the opposite assumption (e.g., that the tape was actually in the bottom-most position) is correct. When the deviation is in the anticipated direction (e.g., down), the assumption is correct. For the opposite initial assumption, the opposite is also true.

Figure 8:
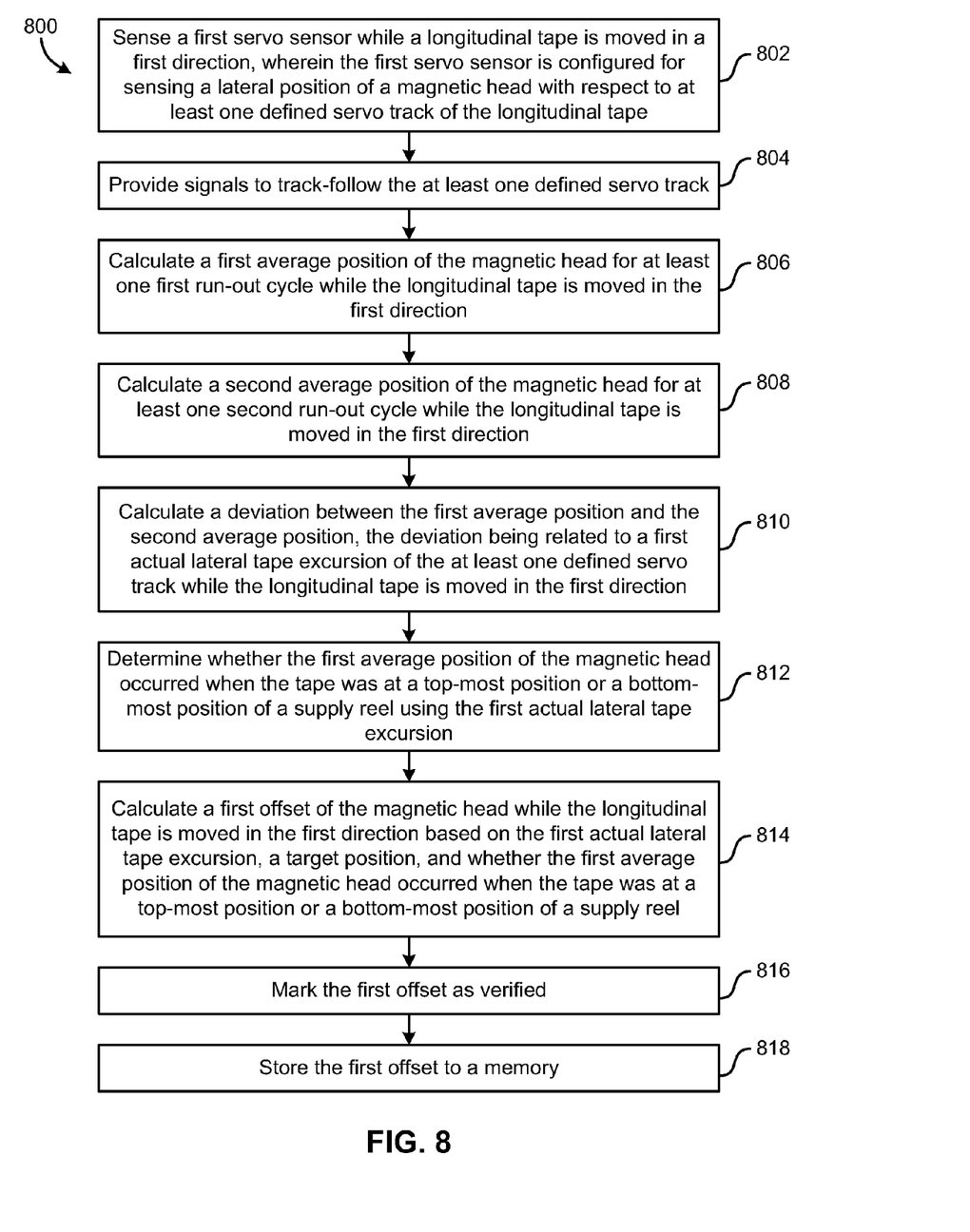
FIG. 8 is a flow diagram of a method, according to one embodiment.

Now referring to FIG. 8, a method 800 is shown according to one embodiment. The method 800 may be carried out in any desired environment, including those shown in FIGS. 1-6, according to various embodiments. Of course, more or less operations than those specifically described below may be included and/or excluded from method 800, according to various embodiments, as would be apparent to one of skill in the art upon reading the present descriptions.

In some embodiments, the method 800 may be performed during cartridge initiation. Of course, other operations such as loading a tape, track-following the servo signal, moving the tape longitudinally past the magnetic head, etc., may performed in concert with method 800, according to various embodiments.

In operation 802, a first servo sensor is sensed while a longitudinal tape is moved in a first direction, wherein the first servo sensor is configured for sensing a lateral position of a magnetic head with respect to at least one defined servo track of the longitudinal tape.

In operation 804, signals are provided to track-follow the at least one defined servo track.

In operation 806, a first average position of the magnetic head is calculated for at least one first run-out cycle while the longitudinal tape is moved in the first direction.

In operation 808, a second average position of the magnetic head is calculated for at least one second run-out cycle while the longitudinal tape is moved in the first direction.

In operation 810, a deviation is calculated between the first average position and the second average position, the deviation being related to a first actual lateral tape excursion of the at least one defined servo track while the longitudinal tape is moved in the first direction.

In operation 812, it is determined whether the first average position of the magnetic head occurred when the tape was at a top-most position or a bottom-most position of a supply reel using the first actual lateral tape excursion.

In operation 814, a first offset of the magnetic head while the longitudinal tape is moved in the first direction is calculated based on the first actual lateral tape excursion, a target position, and whether the first average position of the magnetic head occurred when the tape was at a top-most position or a bottom-most position of a supply reel.

In operation 816, the first offset is marked as verified.

In operation 818, the first offset is stored to a memory.

In further embodiments, it may be verified that the assumption is correct that the first average position of the magnetic head occurred when the tape was at the top- or bottom-most position of the supply reel using the first actual lateral tape excursion, otherwise the first average position of the magnetic head occurred when the tape was at the opposite position of the supply reel. For example, it may be determined whether the deviation is in an anticipated direction or an unanticipated direction based on an assumption that the first average position of the magnetic head occurred when the tape was at the top-most position or the bottom-most position of the supply reel. When the deviation is in the unanticipated direction, the assumption is incorrect and the opposite assumption is correct, and when the deviation is in the anticipated direction, the assumption is correct and the first offset is verified.

In more embodiments, a second servo sensor may be sensed while the longitudinal tape is moved in a second direction, wherein the second servo sensor is configured for sensing a lateral position of the magnetic head with respect to the at least one defined servo track of the longitudinal tape, the second servo sensor is positioned parallel to the first servo sensor in a direction of tape movement, and the second direction is opposite the first direction. Also, position error may be determined between the magnetic head and a desired position related to the at least one defined servo track, signals may be provided to operate the fine actuator to translate the magnetic head laterally in a manner to reduce the determined position error, a third average position of the magnetic head for at least one first run-out cycle while the longitudinal tape is moved in the second direction may be calculated, a fourth average position of the magnetic head for at least one second run-out cycle in the second direction may be calculated, a deviation may be calculated between the third average position and the fourth average position, the deviation being related to a second actual lateral tape excursion of the at least one defined servo track while the longitudinal tape is moved in the second direction, it may be determined whether the third average position of the magnetic head occurred when the tape was at the top-most position or the bottom-most position of the supply reel using the second actual lateral tape excursion, a second offset of the magnetic head while the longitudinal tape is moved in the second direction may be calculated based on the second actual lateral tape excursion, the target position, and whether the third average position of the magnetic head occurred when the tape was at the top-most position or the bottom-most position of the supply reel, the second offset may be marked as verified, and the second offset may be stored to the memory.

In any embodiment described herein, the first offset may be a difference between the first average position and the target position, and the target position may be a midpoint between a maximum lateral tape excursion and a minimum lateral tape excursion.

In another embodiment, the first, second, third, and fourth average positions may be determined based on an average integrator value for the fine actuator.

Figure 9:
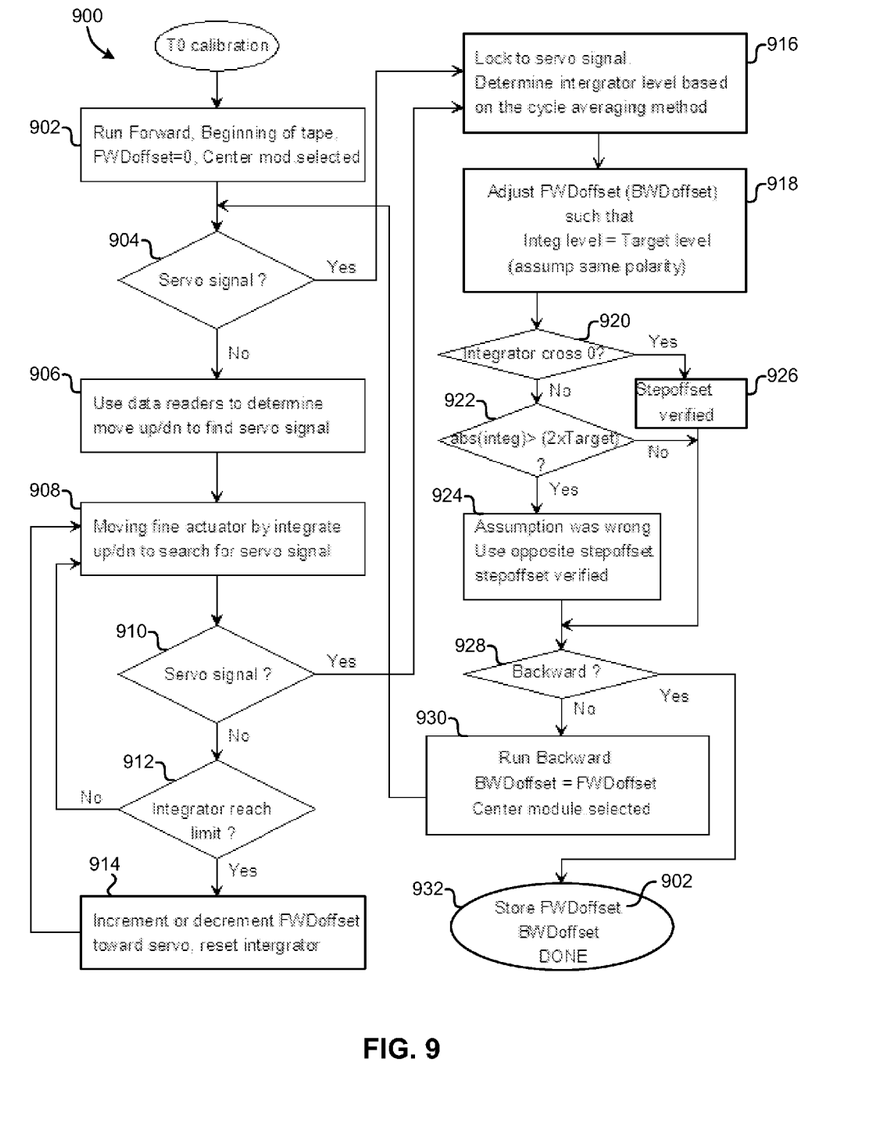
FIG. 9 is a flow diagram of a method, according to one embodiment.

Now referring to FIG. 9, a method 900 is shown according to one embodiment. Although each operation, is described previously herein, this figure attempts to describe a more overall view of the methodology that may be used to quickly track center a tape drive.

In operation 902, a tape is run in a first direction (forward direction) from a BOT, with the FWDoffset set to 0. If the tape head has multiple modules (each having readers and/or writers), then a center module is selected or a module on a leading edge of the head such that the tape may be read more easily and accurately.

In operation 904, it is determined if a servo signal can be detected by a servo sensor on the tape head. If the servo signal is detected, the method 900 moves to operation 916. Otherwise, it moves to operation 906.

In operation 906, it is determined if any sensors on the tape head, including data readers (sensors) can detect the servo signal. If so, the tape head may be moved such that a servo sensor is able to sense the servo signal. If not, the tape head is moved until one of the sensors detects the servo signal.

In operation 908, the tape head is moved up and/or down the lateral direction of the tape in an attempt to detect the servo signal with one of the sensors using the fine actuator.

In operation 910, it is determined if the servo signal can be detected by a servo sensor on the tape head. If the servo signal is detected, the method 900 moves to operation 916. Otherwise, it moves to operation 912.

In operation 912, it is determined if the fine actuator has reached a limit of movement, e.g., the integrator signals that the fine actuator can move no more because a maximum integrated current is being provided to the fine actuator. If the limit has not been reached, the method 900 returns to operation 908, if it has, the method 900 moves to operation 914.

In operation 914, the coarse actuator moves the fine actuator and magnetic head by incrementing or decrementing the FWDoffset such that the coarse actuator moves the head toward the servo signal. Then, the integrator value is reset, and the method 900 returns to operation 908 to continue searching for the servo signal.

In operation 916, the servo signal is locked onto after being detected, and the integrator level (e.g., the magnetic head position) is determined, such as by using average magnetic head positions over one or more run-out cycles, according to one approach.

In operation 918, the FWDoffset when the tape is moving in the forward direction (or the BWDoffset if the tape is moving in the backward direction) is adjusted such that the integrator level is equal to the target level, when it is assumed that the tape is coming of the supply reel (when in the forward direction) or the take-up reel (when in the backward direction) from a top-most or bottom-most position. Preferably, the top-most position is assumed since it is most common in practice.

In operation 920, it is determined if the integrator value crosses a zero point, e.g., the tape jumps from one side of the reel some or all the way to the other side of the reel. If it does, the stepoffset is verified in operation 926 by determining if the jump is appropriate, e.g., negative jump when the tape was assumed to be coming from a top-most position of the reel, or inappropriate, e.g., negative jump when the tape was assumed to be coming from a bottom-most position of the reel. Otherwise, the method 900 continues to operation 922.

In operation 922, it is determined if the absolute integrator value is greater than two times the target value. If so, the method 900 continues to operation 924, otherwise, it proceeds to operation 928.

In operation 924, it is determined that the initial assumption about which position the tape was coming off the reel was incorrect, and the assumption is switched such that it is assumed that the tape was coming off the opposite position of the reel. In this case, the stepoffset is flipped, e.g., stepoffset of 400 becomes −400, and this setpoffset is verified as in operation 926.

In operation 928, it is determined if the method 900 has been performed in a backward direction, e.g., opposite of the forward direction. If so, the method 900 proceeds to operation 932. Otherwise, it proceeds to operation 930.

In operation 930, the tape is run backward, BWDoffset is set to FWDoffset, and if the tape head has multiple modules (each having readers and/or writers), then a center module is selected or a module on a leading edge of the head such that the tape may be read more easily and accurately, and the method returns to operation 916 for backward processing.

In operation 932, FWDoffset and BWDoffset are stored to a memory and the method 900 is concluded.

Any of the implementations and/or embodiments described herein may involve software, firmware, microcode, hardware and/or any combination thereof. The implementation may take the form of code or logic implemented in a medium in the control (20, FIG. 1), such as memory, storage and/or circuitry where the medium may comprise hardware logic (e.g., an integrated circuit chip, Programmable Gate Array (PGA), Application Specific Integrated Circuit (ASIC), or other circuit, logic or device), or a computer readable storage medium, such as a magnetic storage medium, e.g., an electronic, magnetic, optical, electromagnetic, infrared, or semiconductor system, semiconductor or solid state memory, magnetic tape, a removable computer diskette, and random access memory (RAM), a read-only memory (ROM), a rigid magnetic disk and an optical disk, compact disk-read only memory (CD-ROM), compact disk-read/write (CD-R/W), digital versatile disk (DVD), etc.

For example, in one embodiment, a servo system may comprise at least one servo sensor for sensing a lateral position of a magnetic head with respect to at least one defined servo track of a longitudinal tape; a fine actuator configured to translate the magnetic head laterally with respect to the longitudinal tape; a coarse actuator configured to translate the fine actuator laterally with respect to the longitudinal tape; and a servo control configured to: sense a first servo sensor of the at least one servo sensor while the longitudinal tape is moved in a first direction, determine position error between the magnetic head and a desired position related to the at least one defined servo track, and provide signals to operate the fine actuator to translate the magnetic head laterally in a manner to reduce the determined position error (e.g., provide signals to track-follow the at least one defined servo track).

In one embodiment, the servo control may be configured to: calculate a first average position of the magnetic head for at least one first run-out cycle while the longitudinal tape is moved in the first direction, calculate a first offset of the magnetic head while the longitudinal tape is moved in the first direction based on a target position and an assumption that the first average position of the magnetic head occurred when the tape was at a top-most position or a bottom-most position of a supply reel, operate the coarse actuator to position the coarse actuator substantially at the target position using the first offset and the first average position, and store the first offset to a memory.

In another embodiment, the servo control may be configured to: calculate a second average position of the magnetic head for at least one second run-out cycle while the longitudinal tape is moved in the first direction, calculate a deviation between the first average position and the second average position, the deviation being related to a first actual lateral tape excursion of the at least one defined servo track while the longitudinal tape is moved in the first direction, determine that the deviation is in an anticipated direction or an unanticipated direction based on the assumption that the first average position of the magnetic head occurred when the tape was at the top-most position or the bottom-most position of the supply reel, update the first offset to account for the deviation being in the unanticipated direction, mark the first offset as verified, and operate the coarse actuator to position the coarse actuator substantially at the target position based on the verified first offset and the first average position.

In another embodiment, it may be assumed that the first average position of the magnetic head occurred when the tape was at the top-most position of the supply reel, and the servo control is configured to: verify that the assumption is correct that the first average position of the magnetic head occurred when the tape was at the top-most position of the supply reel using the first actual lateral tape excursion when the deviation is in the anticipated direction, or assume that the first average position of the magnetic head occurred when the tape was at the bottom-most position of the supply reel when the deviation is in the unanticipated direction, and re-calculate the first offset based on the first actual lateral tape excursion and the first average position of the magnetic head having occurred when the tape was at the bottom-most position of the supply reel.

According to another embodiment, the system may comprise a second servo sensor for sensing a lateral position of the magnetic head with respect to the at least one defined servo track of the longitudinal tape, the second servo sensor being positioned parallel to the first servo sensor in a direction of tape movement. In this embodiment, the servo control may be configured to: sense the second servo sensor while the longitudinal tape is moved in a second direction, the second direction being opposite the first direction, determine position error between the magnetic head and a desired position related to the at least one defined servo track, provide signals to operate the fine actuator to translate the magnetic head laterally in a manner to reduce the determined position error, calculate a third average position of the magnetic head for at least one first run-out cycle while the longitudinal tape is moved in the second direction, calculate a second offset of the magnetic head while the longitudinal tape is moved in the second direction based on an assumption that the third average position of the magnetic head occurred when the tape was at the top-most position of the supply reel or the bottom-most position of the supply reel, operate the coarse actuator to position the coarse actuator substantially at the target position using the second offset and the third average position, and store the second offset to the memory.

Furthermore, the servo control may be configured to: calculate a fourth average position of the magnetic head for at least one second run-out cycle while the longitudinal tape is moved in the second direction, calculate a second deviation between the third average position and the fourth average position, the second deviation being related to a second actual lateral tape excursion of the at least one defined servo track while the longitudinal tape is moved in the second direction, determine that the second deviation is in an anticipated direction or an unanticipated direction based on the assumption that the second average position of the magnetic head occurred when the tape was at the top-most position or the bottom-most position of the supply reel, update the second offset to account for the second deviation being in the unanticipated direction, mark the second offset as verified, and operate the coarse actuator to position the coarse actuator substantially at the target position based on the verified second offset and the third average position.

In one embodiment, the longitudinal tape may be moved from the supply reel at a known radii near BOT at a fixed, known velocity during the at least one first run-out cycle.

In another embodiment, the first offset may be a difference between the first average position and the target position, and the target position may be a midpoint between a maximum lateral tape excursion and a minimum lateral tape excursion. In these embodiments, the servo control may be configured to: sense from the position error signals lateral tape excursion of the at least one defined servo track, determine a maximum positive peak and a maximum negative peak of the lateral tape excursion, and update the target position based on the maximum positive peak and the maximum negative peak. In a further approach, the servo control may be configured to: update the determined maximum positive peak only by a peak exceeding a previous maximum positive peak, update the determined maximum negative peak only by a peak exceeding a previous maximum negative peak, and update the target position based on the updated maximum positive peak and/or the updated maximum negative peak.

In yet another embodiment, the magnetic head may comprise multiple sets of sensors positioned parallel to each other in a direction perpendicular to the direction of tape movement, and the servo control may be configured to: activate one sensor from each set of sensors to determine which sensor is over the at least one servo track, and provide signals to operate the coarse actuator to translate the magnetic head laterally based on which sensor is over the at least one servo track.

In a preferred embodiment, it is assumed that the first average position of the magnetic head occurred when the tape was at the top-most position of the supply reel, and the servo control is configured to verify that the assumption is correct that the first average position of the magnetic head occurred when the tape was at the top-most position of the supply reel using the first actual lateral tape excursion, or if the assumption is not correct, it is assumed that the first average position of the magnetic head occurred when the tape was at the bottom-most position of the supply reel, and the first offset of the magnetic head while the longitudinal tape is moved in the first direction is re-calculated based on the first actual lateral tape excursion and the first average position of the magnetic head having occurred when the tape was at the bottom-most position of the supply reel.

In another embodiment, a tape drive system, such as that shown in FIG. 1, may comprise the servo system as described herein according to any of various embodiments.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A servo system, comprising:
a servo control configured to:
determine position error between a magnetic head and a desired position related to at least one defined servo track on a longitudinal tape based on at least one servo signal;
calculate a first average position of the magnetic head while the longitudinal tape is moved in a first direction;
calculate a first offset of the magnetic head while the longitudinal tape is moved in the first direction based on a target position and an assumption that the first average position of the magnetic head occurred when the tape was at a top-most position or a bottom-most position of a supply reel; and
operate an actuator to position the actuator substantially at the target position using the first offset and the first average position.

2. The servo system as recited in claim 1, wherein the first average position of the magnetic head is calculated during a first run-out cycle, and wherein the servo control is configured to:
calculate a second average position of the magnetic head for at least one second run-out cycle while the longitudinal tape is moved in the first direction;
calculate a deviation between the first average position and the second average position, the deviation being related to a first actual lateral tape excursion of the at least one defined servo track while the longitudinal tape is moved in the first direction;
determine that the deviation is in an anticipated direction or an unanticipated direction based on the assumption that the first average position of the magnetic head occurred when the tape was at the top-most position or the bottom-most position of the supply reel;
update the first offset to account for the deviation being in the unanticipated direction;
mark the first offset as verified; and
operate the actuator to position the actuator substantially at the target position based on the verified first offset and the first average position.

3. The servo system as recited in claim 1, wherein it is assumed that the first average position of the magnetic head occurred when the tape was at the top-most position of the supply reel, and wherein the servo control is configured to:
verify that the assumption is correct that the first average position of the magnetic head occurred when the tape was at the top-most position of the supply reel using the first actual lateral tape excursion when the deviation is in the anticipated direction; and/or
assume that the first average position of the magnetic head occurred when the tape was at the bottom-most position of the supply reel when the deviation is in the unanticipated direction, and re-calculate the first offset based on the first actual lateral tape excursion and the first average position of the magnetic head having occurred when the tape was at the bottom-most position of the supply reel.

4. The servo system as recited in claim 1, wherein the servo control is further configured to:
determine position error between the magnetic head and a desired position related to the at least one defined servo track on the longitudinal tape based on at least one servo signal;
calculate a third average position of the magnetic head for at least one first run-out cycle while the longitudinal tape is moved in the second direction;
calculate a second offset of the magnetic head while the longitudinal tape is moved in the second direction based on an assumption that the third average position of the magnetic head occurred when the tape was at the top-most position of the supply reel or the bottom-most position of the supply reel;
operate the actuator to position the actuator substantially at the target position using the second offset and the third average position.

5. The servo system as recited in claim 4, wherein the servo control is configured to:
calculate a fourth average position of the magnetic head for at least one second run-out cycle while the longitudinal tape is moved in the second direction;
calculate a second deviation between the third average position and the fourth average position, the second deviation being related to a second actual lateral tape excursion of the at least one defined servo track while the longitudinal tape is moved in the second direction;
determine that the second deviation is in an anticipated direction or an unanticipated direction based on the assumption that the second average position of the magnetic head occurred when the tape was at the top-most position or the bottom-most position of the supply reel;
update the second offset to account for the second deviation being in the unanticipated direction;
mark the second offset as verified; and
operate the actuator to position the coarse substantially at the target position based on the verified second offset and the third average position.

6. A tape drive system comprising the servo system as recited in claim 1.

7. The servo system as recited in claim 1, wherein the longitudinal tape is moved from the supply reel at a known radii near beginning of tape (BOT) at a fixed, known velocity during an at least one run-out cycle.

8. The servo system as recited in claim 1, wherein the first offset is a difference between the first average position and the target position, and wherein the target position is a midpoint between a maximum lateral tape excursion and a minimum lateral tape excursion.

9. The servo system as recited in claim 8, wherein the servo control is configured to:
sense from the position error signals lateral tape excursion of the at least one defined servo track;
determine a maximum positive peak and a maximum negative peak of the lateral tape excursion; and
update the target position based on the maximum positive peak and the maximum negative peak.

10. The servo system as recited in claim 9, wherein the servo control is configured to:
update the determined maximum positive peak only by a peak exceeding a previous maximum positive peak;
update the determined maximum negative peak only by a peak exceeding a previous maximum negative peak; and
update the target position based on the updated maximum positive peak and/or the updated maximum negative peak.

11. The servo system as recited in claim 1, wherein the servo control is configured to:
activate one sensor from each of a plurality of sets of sensors of a magnetic head to determine which sensor is over the at least one servo track; and provide signals to operate the actuator to translate the magnetic head laterally based on which sensor is over the at least one servo track.

12. The servo system as recited in claim 1, wherein the servo control is further configured to store the first offset to a memory.

13. A tape drive system comprising the magnetic head, and the servo system as recited in claim 1.

14. A servo system, comprising:
a servo control configured to:
   calculate a first average position of a magnetic head for at least one first run-out cycle while the longitudinal tape is moved in the first direction;
   calculate a second average position of the magnetic head for at least one second run-out cycle while the longitudinal tape is moved in the first direction;
   calculate a deviation between the first average position and the second average position, the deviation being related to a first actual lateral tape excursion of the at least one defined servo track while the longitudinal tape is moved in the first direction; and
   calculate a first offset of the magnetic head while the longitudinal tape is moved in the first direction based on the first actual lateral tape excursion, a target position, and whether the first average position of the magnetic head occurred when the tape was at a top-most position or a bottom-most position of a supply reel.

15. The servo system as recited in claim 14, wherein the servo control is further configured to store the first offset to a memory.

16. The servo system as recited in claim 14, wherein determining whether the first average position of the magnetic head occurred when the tape was at a top-most position or a bottom-most position of a supply reel using the first actual lateral tape excursion comprises:
   determining whether the deviation is in an anticipated direction or an unanticipated direction based on the assumption that the first average position of the magnetic head occurred when the tape was at the top-most position or the bottom-most position of the supply reel,
   wherein when the deviation is in the unanticipated direction, the assumption is incorrect and the opposite assumption is true, and
   wherein when the deviation is in the anticipated direction, the assumption is correct.

17. The servo system as recited in claim 14, wherein the servo control is configured to:
   calculate a third average position of the magnetic head for at least one first run-out cycle while the longitudinal tape is moved in a second direction, the second direction being opposite the first direction;
   calculate a fourth average position of the magnetic head for at least one second run-out cycle while the longitudinal tape is moved in the second direction;
   calculate a deviation between the third average position and the fourth average position, the deviation being related to a second actual lateral tape excursion of the at least one defined servo track while the longitudinal tape is moved in the second direction;
   determine whether the third average position of the magnetic head occurred when the tape was at the top-most position or the bottom-most position of the supply reel using the second actual lateral tape excursion; and
   calculate a second offset of the magnetic head while the longitudinal tape is moved in the second direction based on the second actual lateral tape excursion, the target position, and whether the third average position of the magnetic head occurred when the tape was at the top-most position or the bottom-most position of the supply reel.

18. A tape drive system comprising the magnetic head, and the servo system as recited in claim 14.

* * * * *